United States Patent [19]
Bantel et al.

[11] 3,868,395
[45] Feb. 25, 1975

[54] PRODUCTION OF PURE 1-NITROANTHRAQUINONE

[75] Inventors: Karl-Heinz Bantel, Ludwigshafen; Heinz Eilingsfeld, Frankenthal, both of Germany

[73] Assignee: Badische Anilin- & Soda-Fabrik Aktiengesellschaft, Ludwigshafen, Rhine, Germany

[22] Filed: June 25, 1973

[21] Appl. No.: 373,131

[30] Foreign Application Priority Data
July 1, 1972 Germany............................ 2232446

[52] U.S. Cl................................. 260/369, 260/378
[51] Int. Cl............................................. C09b 1/00
[58] Field of Search..................................... 260/369

[56] References Cited
UNITED STATES PATENTS
3,766,222   10/1973   Hartwig et al...................... 260/369

FOREIGN PATENTS OR APPLICATIONS
2,142,100   3/1972   Germany............................ 260/369

Primary Examiner—Lorraine A. Weinberger
Assistant Examiner—E. Jane Skelly
Attorney, Agent, or Firm—Johnston, Keil, Thompson & Shurtleff

[57] ABSTRACT

Production of pure 1-nitroanthraquinone from nitroanthraquinone mixtures by treating the mixture in an organic aprotic solvent with a primary or secondary amine or a mixture of the same. A pure 1-nitroanthraquinone in which practically no dinitroanthraquinone or other byproducts can be detected is obtained in a high yield. The 1-aminoanthraquinone obtained from this 1-nitroanthraquinone is suitable for all dye syntheses.

13 Claims, No Drawings

PRODUCTION OF PURE 1-NITROANTHRAQUINONE

The invention relates to a process for the production of pure 1-nitroanthraquinone.

Mixtures of different compounds are always obtained in the nitration of anthraquinone. Mononitration cannot be carried out uniformly: 1-nitroanthraquinone is only obtained contaminated with 2-nitroanthraquinone and various dinitro compounds. In the case of nitrations in concentrated sulfuric acid products are obtained as a rule which contain only about 60 to 75% by weight of 1-nitroanthraquinone.

Since the tinctorial properties of the dyes which have been prepared from secondary products of 1-nitroanthraquinone are often adversely affected by impurities present in the starting material it is desirable to start from the purest possible 1-nitroanthraquinone.

It is an object of the present invention to recover pure 1-nitroanthraquinone from nitration products of anthraquinone obtained by conventional nitration methods.

We have found that 1-nitroanthraquinone is obtained in a good yield and in excellent purity by treating a nitroanthraquinone mixture containing 1-nitroanthraquinone in an organic solvent with a primary amine, a secondary amine or a mixture of the two. The undesired byproducts from the nitration are converted in this treatment into more easily soluble compounds and can therefore be separated from the unreacted 1-nitroanthraquinone. It is surprising that the byproducts should undergo this conversion while 1-nitroanthraquinone is substantially or wholly unaffected.

Nitroanthraquinone mixtures for subjection to the purification process of the invention may be for example mixtures obtainable by prior art nitration methods which as a rule contain only up to 75% by weight of 1-nitroanthraquinone. Mixtures which have a higher proportion of 1-nitroanthraquinone are naturally more easily purified.

The primary and/or secondary amines to be used according to the invention may be aliphatic, cycloaliphatic, araliphatic or saturated heterocyclic. For economical and technical reasons it is recommended that liquid commercially available amines of a boiling point more than 50°C should be used. Monoalkylamines and dialkylamines whose alkyl groups may bear hydroxy, alkoxy, amino or substituted amino as substituents and also saturated N-heterocycles are particularly suitable. Specific examples are: n-propylamine, di-n-propylamine, monobutylamine, dibutylamine, di-(2-ethylhexyl)-amine, mono-2-ethylhexylamine, N-butyl-2-ethylhexylamine, 2-methoxyethylamine, di-(2-methoxyethyl)-amine, 2-ethoxyethylamine, 3-methoxypropylamine, cyclohexylamine, benzylamine, phenylethylamine, aminomethylcyclopentylamine, 3-cyclohexylaminopropylamine, 1-diethylamino-4-aminopentane, 3-dimethylaminopropylamine, 2-diethylaminoethylamine, monomethylethanolamine, monoethylethanolamine and aminoethylethanolamine.

Pyrrolidine, piperazine, N-methylpiperazine and N-β-hydroxyethylpiperazine are also suitable.

Examples of preferred amines are: ethanolamine, diethanolamine, butylamine, morpholine and piperidine and of these morpholine is particularly preferred because in the treatment it gives a particularly pure 1-nitroanthraquinone in a high space-time yield.

The amount of amine to be used depends on the nature and amount of the impurities. It is convenient to use from 0.7 to 4 moles, preferably from 1.5 to 3 moles, of amine per mole of dinitro compound present in the mixture. The use of larger amounts of amine is possible but does not result in any further advantage as regards purification effect.

The solvent used is an aprotic organic solvent in which 1-nitroanthraquinone is substantially insoluble but in which the products formed with the amine are soluble.

It has been found that particularly suitable solvents include halogenated aliphatic and aromatic hydrocarbons such as methylene chloride, chloroform, carbon tetrachloride, 1,1-dichloroethane, 1,2-dichloroethane, trichloroethane, tetrachloroethane, tetrachloroethylene, dichloropropane, dibromoethane, chlorobenzene, dichlorobenzene, trichlorobenzene, bromobenzene, chloronaphthalene and aliphatic N,N-dialkylcarboxamides, particularly those of propionic acid, acetic acid and especially of formic acid, and also N-methylpyrrolidone or mixtures of these solvents. Anisole and nitrobenzene are examples of further useful solvents.

Examples of preferred solvents are: N,N-dimethylformamide, N-methylpyrrolidone, 1,1-dichloroethane, 1,2-dichloroethane, dichloropropane, anisole, nitrobenzene, chlorobenzene and chloronaphthalene of which N,N-dimethylformamide and N-methylpyrrolidone are especially preferred because of their good solvency for the conversion products of dinitroanthraquinones.

The amount of solvent used may be varied within wide limits. The amount used as a rule (based on the nitroanthraquinone mixture) is 0.5 to about 10 times, preferably from 0.7 to 3.0 times the weight. It depends on the composition of the nitroanthraquinone mixture to be purified and on the solubility and amount of the amine conversion products formed.

The reaction is generally carried out at a temperature of from 40° to 250°C and the preferred temperature range is from 70° to 150°C. When a temperature below 70°C is used the reaction period is as a rule longer and at temperature above 150°C and especially at above 200°C there is a risk that undesirable byproducts will be formed.

A convenient procedure consists in freeing the nitroanthraquinone mixture from any adherent water by drying or by washing with a lower alcohol or ketone such as methanol, isopropanol or acetone and then stirring it with the amine in an organic solvent at elevated temperature. The nitroanthraquinone mixture may also be brought together as an aqueous paste with the solvent, any adherent water distilled off azeotropically and the amine then added and the whole stirred again at elevated temperature.

To work up the reaction mixture it is conveniently allowed to cool to room temperature and the precipitate is suction filtered; it consists of pure 1-nitroanthraquinone.

1-nitroanthraquinone obtained by the new process may be reduced by conventional methods to 1-aminoanthraquinone which is outstandingly suitable for the production of dyes and dye precursors.

Another advantage of the process of the invention is that dinitroanthraquinones contained in the nitroanthraquinone mixture are converted into compounds which, unlike dinitroanthraquinones, can be burnt in conventional incinerators.

The following Examples illustrate the process in detail; the parts and percentages given are by weight and the temperatures are given in degrees Centigrade.

EXAMPLE 1

3.5 parts of morpholine is added to a mixture of 25 parts of 1-nitroanthraquinone (about 75% purity, the remainder consisting of about 3 to 5% of 1,5-dinitro-, 3 to 5% of 1,8-dinitro-, 10% of 1,6-dinitro-, 1,7-dinitro- and 2,7-dinitroanthraquinones and 2-nitroanthraquinone) and 40 parts of N,N-dimethylformamide and the whole is stirred for 3 hours at 100°C. After cooling to 20°C the precipitate is suction filtered and washed first with a little cold N,N-dimethylformamide and then with water. After drying 16.0 parts of pure 1-nitroanthraquinone is obtained which can be reduced by conventional methods to pure 1-aminoanthraquinone.

The yield of 1-nitroanthraquinone is equivalent to 85% of theory and the purity of 1-aminoanthraquinone prepared therefrom is higher than 96%.

EXAMPLE 2

4.5 parts of piperidine is added to a mixture of 25 parts of 1-nitroanthraquinone of the composition specified in Example 1 and 40 parts of nitrobenzene and the whole is stirred for 3 hours at 100°C. After cooling to 20°C the precipitate is suction filtered, washed first with cold methanol until devoid of nitrobenzene and then with water and dried. 15.6 parts of pure 1-nitroanthraquinone is obtained which can be converted by a conventional method into 1-aminoanthraquinone. The yield of 1-nitroanthraquinone is 83% of theory and the purity of 1-aminoanthraquinone prepared therefrom is higher than 95%.

EXAMPLE 3

4.5 parts of morpholine is added to a mixture of 25 parts of 1-nitroanthraquinone (composition as in Example 1) and 50 parts of chlorobenzene and the whole is stirred for another 4 hours at 120°C and then cooled to 20°C. The precipitate is suction filtered, washed free from chlorobenzene with a little acetone and then with water and dried. 16.2 parts of pure 1-nitroanthraquinone is obtained which can be reduced to 1-aminoanthraquinone by a conventional method. The yield of 1-nitroanthraquinone is equivalent to 86% of theory and the purity of 1-aminoanthraquinone prepared therefrom is more than 96%.

EXAMPLE 4

3.7 parts of n-butylamine is added to a mixture of 25 parts of 1-nitroanthraquinone of the composition specified in Example 1 and 80 parts of 1,2-dichloroethane and the whole is stirred for six hours at 84°C and then cooled to 20°C. The precipitate is suction filtered, washed free from solvent with water and dried. 16.7 parts of pure 1-nitroanthraquinone is obtained, i.e., a yield of 89% of theory.

EXAMPLE 5

4.4 parts of morpholine is added to a mixture of 25 parts of 1-nitroanthraquinone of the composition specified in Example 1 and 75 parts of anisole and the whole is stirred for 3 hours at 120°C and then cooled to 20°C. The precipitate is suction filtered, washed with cold methanol until it is devoid of anisole and dried. 15.3 parts of 1-nitroanthraquinone is obtained, i.e. 81% of theory. 1-aminoanthraquinone prepared therefrom by a conventional method has a purity of more than 95%.

EXAMPLE 6

5.3 parts of diethanolamine is added to a mixture of 25 parts of 1-nitroanthraquinone of the composition specified in Example 1 and 45 parts of N,N-dimethylformamide and the whole is stirred for 3 hours at 100°C and then cooled to room temperature. The precipitate is suction filtered, washed first with a little cold N,N-dimethylformamide and then with water until devoid of solvent and then dried. 16.7 parts of pure 1-nitroanthraquinone is obtained, i.e. 89% of theory.

EXAMPLE 7

20 parts of morpholine is added to a mixture of 100 parts of 1-nitroanthraquinone (about 65% of 1-nitroanthraquinone, from 5 to 8% of 1,5-dinitro-, from 5 to 8% of 1,8-dinitro-, about 17% of 1,7-dinitro- and 2,7-dinitroanthraquinone and a little 2-nitroanthraquinone) in 160 parts of N,N-dimethylformamide and the whole is stirred for 4 hours at 110°C and then cooled to 20°C. The precipitate is suction filtered and washed, first with a little cold N,N-dimethylformamide and then with water. After drying 55 parts of pure 1-nitroanthraquinone is obtained.

EXAMPLE 8

7 parts of morpholine is added to a mixture of 50 parts of 1-nitroanthraquinone having the composition specified in Example 7 and 50 parts of N-methylpyrrolidone and the whole is stirred for 3 hours at 100°C and then allowed to cool. The precipitate is suction filtered and washed with 25 parts of N-methylpyrrolidone and then with 50 parts of methanol and finally with water.

The yield is 29.5 parts of 1-nitroanthraquinone containing less than 0.4% of dinitroanthraquinone and 2-nitroanthraquinone.

EXAMPLE 9

The procedure given in Example 8 is adopted but 10.5 parts of 2-ethylhexylamine is used instead of 7 parts of morpholine. After working up 27 parts of 1-nitroanthraquinone is obtained which contains less than 0.4% of dinitroanthraquinones and 2-nitroanthraquinone.

EXAMPLE 10

7.5 parts of 3-methoxypropylamine is added to a mixture of 50 parts of 1-nitroanthraquinone (containing about 75% of 1-nitroanthraquinone, about 3 to 5% of 1,5-dinitroanthraquinone, 3 to 5% of 1,8-dinitroanthraquinone and 10% of 1,6-, 1,7- and 2,7-dinitroanthraquinones and 2-nitroanthraquinone) and 50 parts of N-methylpyrrolidone and the mixture is stirred for 3 hours at 100°C and then allowed to cool. The precipitate is suction filtered and washed with 25 parts of N-methylpyrrolidone, then with 50 parts of methanol and finally with water.

The yield is 28.2 parts of 1-nitroanthraquinone which contains less than 0.4% of dinitroanthraquinones and 2-nitroanthraquinone.

EXAMPLE 11

10.5 parts of 2-ethylhexylamine is added to a mixture of 50 parts of 1-nitroanthraquinone having the composition specified in Example 10 and 50 parts of N,N-dimethylformamide and the whole is stirred for 3 hours at 100°C and then allowed to cool. The precipitate is suction filtered and washed with 25 parts of N,N-dimethylformamide, then with 50 parts of methanol and finally with water.

The yield is 29.7 parts of 1-nitroanthraquinone which contains less than 0.4% of dinitroanthraquinones and 2-nitroanthraquinone.

EXAMPLE 12

The procedure described in Example 11 is followed but 7.5 parts of 3-methoxypropylamine is used instead of 2-ethylhexylamine. After working up 28.4 parts of 1-nitroanthraquinone is obtained which contains less than 0.3% of dinitroanthraquinones and 2-nitroanthraquinone.

EXAMPLE 13

The procedure described in Example 11 is followed but 10 parts of N-methylbenzylamine is used instead of 2-ethylhexylamine. After working up 29.8 parts of 1-nitroanthraquinone is obtained which contains less than 0.4% of dinitroanthraquinones and 2-nitroanthraquinone.

We claim:

1. A process for the production of pure 1-nitroanthraquinone from a crude mixture of mono- and dinitroanthraquinones which comprises treating said crude mixture in an aprotic organic solvent with an aliphatic, cycloaliphatic, araliphatic or saturated heterocyclic primary or secondary amine or mixtures thereof, using said amine or amine mixture in an amount of from 0.7 to 4 moles per mole of dinitro compounds in the crude mixture and carrying out the treatment at a temperature of about 40°C. to 250°C.

2. A process as claimed in claim 1 wherein an aliphatic or aromatic halogenated hydrocarbon, nitrobenzene, anisole, an aliphatic N,N-dialkylcarboxamide or a mixture thereof is used as the organic solvent.

3. A process as claimed in claim 1 wherein N,N-dimethylformamide, N-methylpyrrolidone, anisole, chlorobenzene, nitrobenzene or 1,2-dichloroethane is used as the solvent.

4. A process as claimed in claim 1 wherein ethanolamine, diethanolamine, butylamine, piperidine, morpholine or a mixture thereof is used as the amine.

5. A process as claimed in claim 1 wherein the amount of aprotic organic solvent is from 0.5 to 10 times the weight of the nitroanthraquinone mixture.

6. A process as claimed in claim 3 wherein the amount by weight of solvent is from 0.7 to 3.0 times the weight of the nitroanthraquinone mixture.

7. A process as claimed in claim 4 wherein from 1.5 to 3 moles of said amine or amine mixture is used per mole of dinitro compounds present in the crude mixture.

8. A process as claimed in claim 1 wherein the treatment with the amine is carried out at a temperature of from 40° to 200°C.

9. A process as claimed in claim 3 wherein the treatment is carried out at a temperature of from 70° to 150°C.

10. A process as claimed in claim 7 wherein the treatment is carried out at a temperature of from 70° to 150°C.

11. A process as claimed in claim 1 wherein from 1.5 to 3 moles of said amine or amine mixture is used per mole of dinitro compounds present in the crude mixture, and the treatment is carried out at a temperature of 40°C. to 200°C.

12. A process as claimed in claim 11 wherein said aprotic organic solvent is selected from the group consisting of an aliphatic or aromatic halogenated hydrocarbon, nitrobenzene, anisole, an aliphatic N,N-dialkylcarboxamide or a mixture thereof.

13. A process as claimed in claim 12 wherein the treatment is carried out at a temperature of 70°C. to 150°C.

* * * * *